United States Patent [19]
Hassenboehler, Jr. et al.

[11] Patent Number: 5,244,482
[45] Date of Patent: Sep. 14, 1993

[54] POST-TREATMENT OF NONWOVEN WEBS

[75] Inventors: Charles B. Hassenboehler, Jr.; Larry C. Wadsworth, both of Knoxville, Tenn.

[73] Assignee: The University of Tennessee Research Corporation, Knoxville, Tenn.

[21] Appl. No.: 858,182

[22] Filed: Mar. 26, 1992

[51] Int. Cl.$^5$ .............................................. B01D 39/16
[52] U.S. Cl. .................. 55/528; 55/DIG. 5; 55/DIG. 39
[58] Field of Search .............. 55/527, 528, DIG. 39, 55/DIG. 5

[56] References Cited

U.S. PATENT DOCUMENTS

| | | | |
|---|---|---|---|
| 2,612,966 | 10/1952 | Nicol | 55/528 X |
| 2,740,184 | 4/1956 | Thomas | 28/78 |
| 4,048,364 | 9/1977 | Harding et al. | 428/113 |
| 4,215,682 | 8/1980 | Kubik et al. | 128/205 |
| 4,225,642 | 9/1980 | Hirakawa | 55/528 X |
| 4,296,163 | 10/1981 | Emi et al. | 55/528 X |
| 4,375,718 | 3/1983 | Wadsworth et al. | 29/592 E |
| 4,588,537 | 4/1986 | Klaase et al. | 264/22 |
| 4,592,815 | 6/1986 | Nakaro | 204/165 |
| 4,824,451 | 4/1989 | Vogt et al. | 55/528 |
| 4,874,399 | 10/1989 | Reed | 55/DIG. 39 |
| 4,874,659 | 10/1989 | Ando et al. | 55/528 X |
| 4,902,306 | 2/1990 | Burnett et al. | 55/528 X |
| 4,904,174 | 2/1990 | Moosmayer et al. | 425/174.8 E |
| 4,917,942 | 4/1990 | Winters | 55/DIG. 39 |
| 4,961,974 | 10/1990 | Jones | 55/528 X |
| 5,037,455 | 8/1991 | Scheineson et al. | 55/528 X |
| 5,053,066 | 10/1991 | Hassenboehler | 55/528 X |
| 5,122,048 | 6/1992 | Deeds | 425/174.8 E |

FOREIGN PATENT DOCUMENTS

| | | | |
|---|---|---|---|
| 59-145013 | 8/1984 | Japan | 55/528 |
| 1347176 | 2/1974 | United Kingdom . | |

*Primary Examiner*—Robert Spitzer
*Attorney, Agent, or Firm*—Luedeka, Hodges, Neely & Graham

[57] ABSTRACT

A method for post-treating a precursor nonwoven web including consolidating the web laterally and thereby reducing the maximum pore size measure of the web. The resultant nonwoven web is also disclosed as is utilization of the product web as a filter.

30 Claims, 6 Drawing Sheets

POST-TREATMENT OF NONWOVEN WEBS

FIELD OF THE INVENTION

This invention relates generally to nonwoven webs which have been post-treated to reduce the pore size in the web. In one aspect, the invention relates to post-treatment of meltblown webs to improve the web's properties for a variety of uses. In another aspect, the invention relates to the post-treatment of spun-bond webs for the same purpose. In still another aspect of the invention, nonwoven webs are firstly drawn under thermal conditions and secondly mechanically compacted to efficiently alter the geometric arrangement of the fibers making up the web resulting in web having reduced measures of pore size.

BACKGROUND OF THE INVENTION

Meltblowing is a process for manufacturing nonwoven products by extruding molten thermoplastic resins through fine capillary holes (orifices) and blowing hot air on each side of the extruded filaments to attenuate and draw down the filaments. The filaments are collected on a screen or other suitable collection device as a random entangled nonwoven web. The web may be withdrawn and further processed into consumer goods such as mats, fabrics, webbing, filters, battery separators, and the like. Also, the consumer goods may be produced in line with the meltblowing line.

As indicated above, the present invention relates to the post-treatment of nonwoven webs to alter the filament spacing and structure of the webs. It should be observed that the terms "filaments" or "fibers" are used interchangeably herein, although "fibers" in nonwovens generally refers to discontinuous strands and "filaments" as continuous strands. The present invention contemplate webs with continuous filaments and/or discontinuous fibers.

Since the development of the meltblowing process by the Naval Research Laboratory in 1951 (published in 1954 by the U.S. Department of Commerce in an article entitled "MANUFACTURE OF SUPERFINE ORGANIC FIBERS"), there has been a considerable effort by several companies operating in the industry to find new uses for the nonwoven product having micro-sized fibers. Because of the random, geometric assembly or structure of the fibers, and relatively small fiber size, the fibers have received extensive use as filters.

In the formation process for most random laid or unordered fibrous webs, the pore size that develops is inversely related to the square of the fiber diameter. The spunbonded process is distinguished from meltblowing by self-bonding and non uniform draw down (plastic deformation) of filaments forming the web. Thus meltblown webs have a relatively broad distribution of fiber diameters. Typical nonwoven webs produced by meltblowing have fiber diameters of 0.5 to 20 microns, preferably 0.5 to 8 microns, making them suitable for filtering out 5 micron particles at 80 percent efficiency or greater. It is known that filtration can be improved by practicing the web formation process to produce smaller and smaller diameter fibers while controlling other formation parameters such as porosity and thickness. As noted above, this results in smaller pore size thereby improving the efficiency of particle removal in filtration. By operating the meltblowing process under extreme conditions, the fiber size can be produced in the order of 0.1 to 5 microns. The process, however, has the following disadvantages: low production rates, high energy usage. In order to improve the properties of the nonwoven web, efforts have been made to post-treat the webs by a variety of processes. Such efforts have included post calendering the web to improve, the tensile strength of the web, post electrification as disclosed in U.S. Pat. No. 4,592,815 to improve filtration performance of the web, to name but two of such efforts. It is significant to note that none of these prior art techniques have been directed specifically at planar consolidation to reduce the size of the pores in the web.

Calendering of nonwovens flattens fibers and consolidates the web in a direction normal to the plane of the web and reduces the thickness. This, however, leads to reduction in permeability which is an important property to conserve for many filtration purposes. U.S. Pat. No. 4,048,364 discloses a process for drawing the meltblown web in the machine direction (MD) to produce a ten-fold increase in the tensile strength of the post-drawn web. It is significant to note, however, that the precursor web required in this invention contains relatively coarse fibers (10 to about 40 microns average fiber diameter) and polymer of low crystallinity. Low crystallinity generally means about 22% or less. The extensive drawing of the web reduces the diameter of the fibers in the machine direction to an average diameter of 1 to 8 microns at draw ratios ranging from 2:1 to 10:1 and preferably 5:1 to 7:1. The main purpose of the process is to increase the molecular orientation to enhance the strength of the greatly drawn fibers. Precursor webs of very high post processing draw ratio capability are required in order to prevent rupture of fibers in the web drawing process. Tests have shown that the stretching of a precursor web having hot (e.g., 10° F. less than the melting point of the precursor web) drawing capabilities from about 5:1 to 10:1 does not alter the measure of pore size of the web. This is probably due to the fact that the high and easy drawability of the fibers prevents the development of sufficient, compressive forces to bend the stout fibers in the web and physically reduce its pore dimensions and measures of pore size distribution in general.

SUMMARY OF THE INVENTION

It has surprisingly been discovered that by selecting a nonwoven web with certain properties and post-drawing the web under certain conditions, the fibers making up the web are restructured to provide the web with reduced pore sizes, and a narrower pore size distribution. Such post-treated webs have unique measures of pore size, directional absorption and elastic recovery properties which make them ideally suited for a variety of end use applications such as filters, vacuum cleaner bags, protective apparel, face masks, diapers or sanitary napkin parts, wound dressings, respirators, wipes, chemical reservoirs, wicks, and surgical drapes.

The method of the present invention involves subjecting a bonded thermoplastic nonwoven web having a relatively low tensile extensibility during post processing (as reflected by a low draw ratio at break) to primary drawing under an elevated temperature. This uni-directional drawing in the MD laterally consolidates the web to a great extent thereby reducing both the average pore size of the web and narrowing the pore size distribution. The resultant web exhibits improved uniformity in pore size and high lateral elasticity characteristic of "stretch fabric" having approximately 120% elongation to break.

In an alternate embodiment, the web being drawn may be passed into supplemental mechanical compacting means to induce and/or refine the primary web consolidation.

Although the present invention is described and exemplified in connection with meltblown and spunbond webs, it is to be understood that it has application with other nonwovens such as hydro-entangled, needled webs, and laminated combinations of these and with other web forms such as air laid, etc.

DESCRIPTION OF THE PREFERRED EMBODIMENTS

As indicated above, the present invention relates to the post-treatment of a precursor nonwoven web to reconstitute or restructure the fibers of the web and reduce the measures of pore size. The term "nonwoven" as used herein means randomly laid fibers or filaments to form a web wherein some of the fibers are bonded by fiber-to-fiber fusion or fiber entanglement, or thermal bonds as by point bonding. The term "pore size" means a quantification of the physical dimensions of channels oriented in a generally normal direction to the plane of the web. The pore size values recited herein are based on standard test method ASTM F 316-86.

The present invention described with specific reference to the preferred webs will be meltblown webs; it is to be emphasized, however, that the method and product produced thereby includes other nonwoven webs, specifically spunbond, hydro-entangled, needled webs and laminated combinations of these. Also the web produced according to the present invention used in combination with other webs or substrates such as webs from elastomeric polymers, microporous films or stretch limiting materials post laminated to limit the CD extensibility to less than 100% provide additional performance properties for added utility.

Figure 1:
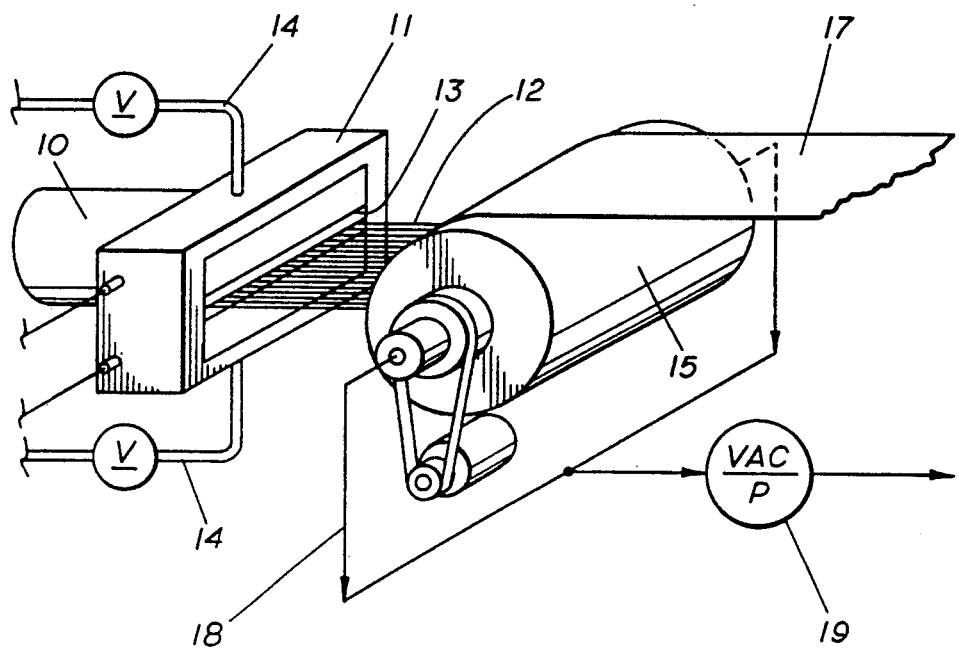
FIG. 1 is a perspective view of apparatus for producing meltblown webs.

Meltblowing is a well known process which generally utilizes equipment depicted in the schematic of FIG. 1. The process is carried out by introducing a thermoplastic resin into an extruder 10 where the polymer is heated, melted, and extruded through a die 11 to form a plurality of side-by-side filaments 12 while converging layers of hot air (discharging from slots 13 on each side of the row of filaments) contact the filaments and through drag forces stretch and attenuate the filaments 12 to a micron-size. The fibers 12 are collected onto a collector such as a rotating screen 15 forming a nonwoven web 17 which may be withdrawn on a take-up roller for later processing. The collector 15 may include a vacuum screen wherein a vacuum, through line 18, is drawn by a vacuum pump 19.

The hot air (primary jet air) is introduced into opposite sides of the die through line 14. Although not indicated on the drawing, secondary air which is aspirated into the primary air/fibrous stream serves to cool the filaments discharging from the die 11.

The process and apparatus described above forms no part of the present invention; however, variables used in the process, (including the type of resin employed, the amount and temperature of primary air and polymer melt, and the spacing of the collector 15 from the die discharge) will have a significant effect on the precursor web properties.

Briefly, the process in one embodiment of the present invention comprises the steps of (a) selecting a thermoplastic nonwoven precursor web with substantial fiber bonding and having relatively low processing extensibility and (b) passing the nonwoven web through a heated zone to increase the temperature of the web to its softening temperature while drawing the web in the machine direction (MD) thereby greatly plastically bending the cross direction (CD) fibers in the web which consolidates the web in the CD reducing the maximum pore size of the precursor web by at least 20 percent, and, more significantly, reducing the pore size distribution by at least 20%. As described in detail below, the precursor web must have certain properties to enhance consolidation.

Figure 2:
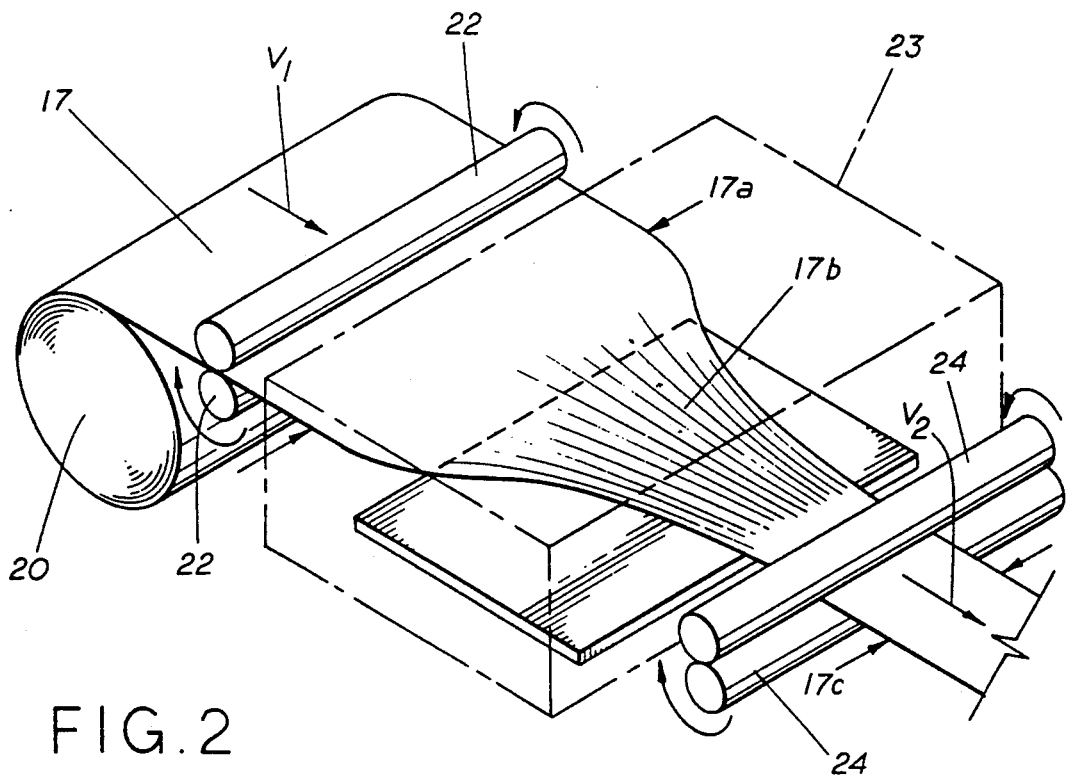
FIG. 2 is a perspective view of apparatus for the practice of the present invention.
Figure 6:
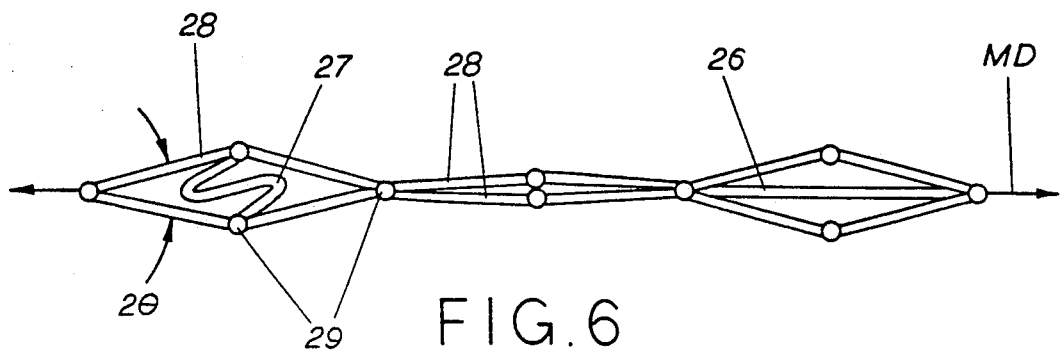
FIG. 6 is a view similar to FIG. 5 after the web had been drawn.

Apparatus for carrying out a preferred process is illustrated schematically in FIG. 2 wherein the precursor web 17 is unwound from roll 20 and fed through the nip of counter-rotating feed rollers 22, through oven 23, and finally through the nip of counter-rotating rollers 24. The oven 23 is maintained at a temperature to heat the precursor web 17 to a temperature between its softening point and the melting point of the polymers in the web. Preferably the web is heated to a temperature within 15° F. of its melting point. The rotating rollers 24 are driven at a speed in excess of the rotating feed rollers 22 so that the output velocity (V2) of the web is in excess of the feed velocity (V1) for the draw ratio which is a function of the velocity ratio V2/V1. The initial drawing of the web 17 under thermal conditions causes web to contract within the oven 23 from its feed width 17a as illustrated by web section 17b in FIG. 2. This contraction is due primarily to the plastic bending deformation by planar compression of generally CD fibers of the web thereby reducing the measures of pore size of the web. It is important to note that the high MD tensile forces developed at low MD strain during drawing, together with the network nature of the fiber-fiber bonds in the web augments the generation of enough compressive stress to easily bend most CD fiber segments 27 and compact the web in the CD as shown in FIG. 6. Since fiber bending rigidity is related to the fourth power of the fiber diameter, only webs having small average fiber diameters can be consolidated by the available stresses with the associated reduction in pore size measures. Average fiber diameter for meltblown webs are preferably less than about 9 microns, and less than about 50 microns for spunbonded webs.

The lateral contraction which results in pore size reduction is not accompanied by significant average fiber diameter reduction of MD fibers. Continued web stretching beyond that necessary for web pore size reduction may cause fiber diameter reductions. The web is contracted to a minimum width 17c as the web 17 exits the oven 23 or as the web 17 passes the nip of rollers 24. It is preferred but not essential to cool or permit the web to cool between the exit of the oven 23 and the nip of the rollers 24 thereby controlling the heat set or annealing in the restructured fibers under stress.

As the web 17 cools to between 130° and 90° C. (for PP), the web can be electrostatically charged to impart durable enhanced filtration efficiency to the web products. (The nip of the rollers 24 and that of rollers 22 preferably are parallel so that the tensile force applied by rollers 24 and the resistance applied by rollers 22 are uni-directional [e.g., uniaxial]).

Figure 3:
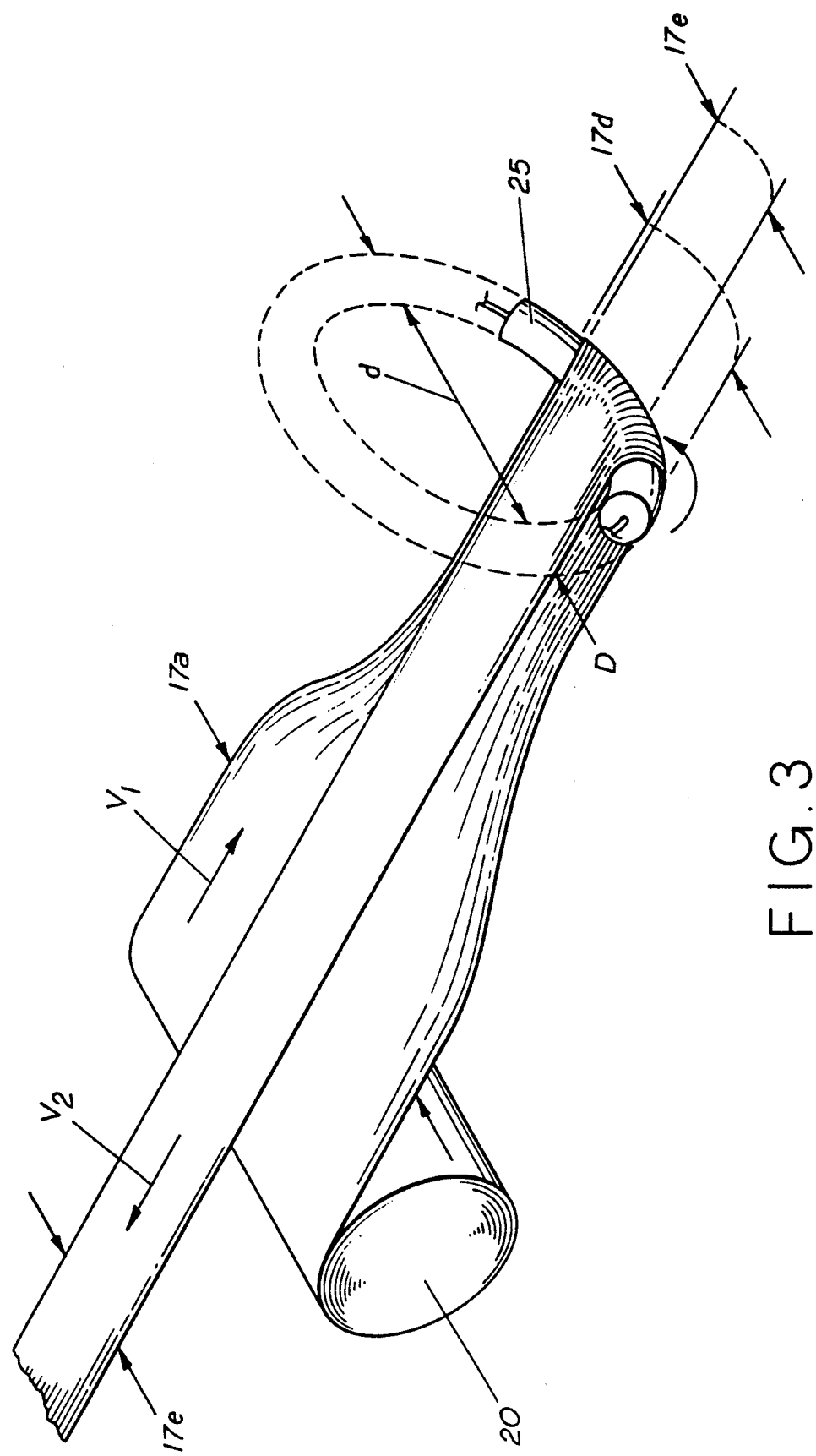
FIG. 3 is a perspective view of an alternate embodiment of an apparatus for the practice of the invention illustrating the drawn web passing over a torus surface for variably imparting compaction forces to the consolidating web.

To further control or narrow the distribution of pore sizes, supplementary or alternative web-width compaction means can be added between 17a and 17c as schematically illustrated in FIG. 3. FIG. 3 shows one alternate web processing embodiment in which the web passes into a supplementary or alternative web compacting device consisting of a (tilted) section of torus 25. The consolidation interval of the web 17 and the torus bar 25 are heated in an oven or heated to provide the proper temperatures for drawing and consolidating the web. The web enters the outboard surface (of diameter D) of the torus at width dimension 17d and exits near the inboard surface of the torus which has a lesser width dimension 17e. The converging surface of the path around the torus applies transverse compressive forces in the plane of the web of entry width 17d. The added compressive forces overcome the bending resistance of inefficiently deformed large CD fiber segments or shot imperfections remaining in the web 17 following primary consolidation (if used). This improves the uniformity in pore sizes. The heating and stretching of the apparatus in FIG. 2 (gross drawing) and FIG. 3 (secondary drawing) can be carried out in series. The primary heating-drawing step imparts gross consolidation while the secondary torus consolidator refines the processing. The maximum compressive strain imparted to the web by traversing about 180° around the torus surface is given by (D-d)/D, where D is the outboard or entry perimeter related to the entry width 17d and d is the inboard or web exit perimeter of the torus 25. The magnitude of the supplementary consolidation can be adjusted by adjusting the two diameters of the torus 25 compacting device or "c-roll" shown in FIG. 3. If the c-roll is made straight (VIZ. radii = ∞), then no lateral compaction occurs and the roll solely increases the anneal time and maintains the thickness of the web. The torus surface can be fixed or can be a rotatable curved flexible bar. A fixed torus 25 with an air bearing between the surface and the web allows high lateral compressive strain and low friction for additional MD draw. It should be noted that revolving "Bowed rolls" are only used in textile applications to remove wrinkles from a moving textile fabric by laterally stretching the fabric as the textile proceeds around a surface of diverging width.

The important parameters of the precursor web 17 and the process condition, along with the unique properties of the web produced by the process are described in detail below.

Precursor Web: A nonelastomeric nonwoven precursor web is selected based on its dimensions, and its hot processing tensile properties (VIZ., elongation-at-break). In general, the breaking draw ratio of the web during hot processing should be less than about 4.0 and greater than about 1.4 evaluated while hot drawing at a strain rate greater than 2500% /min and temperature greater than the softening point but at least 10 degrees F. less than the polymer melting temperature. This is an important indicator of precursor molecular orientation state for achieving sufficient stresses for CD fiber buckling and bending to cause reduction of the measures of pore size distribution of the web by the process of the present invention. The room temperature elongation (strain) at break should be between 2 and 40 percent, preferably between 5 and 20 percent, based on test method ASTM D 1117-77 using the Instron tensile testing machine. Note that the precursor webs disclosed in U.S. Pat. No. 4,048,364 are totally unsatisfactory for use in the present invention because such precursor webs are characterized as having at least 50%, preferably at least 70%, standardized elongation before break, preferable max processing draw ratio greater than 5. Webs made up of low modulus, low crystalline (less than 22%), exhibit too much elongation at low tension in the heating and drawing step to permit development of the necessary stresses. The webs useful in the process of U.S. Pat. No. 4,048,364 have far greater maximum draw ratio than 4 under the hot draw condition described above. It is estimated that these draw ratios are greater than 5.

Compressive stresses which buckle and bend CD fibers in the present invention are given by a sine function of the fiber tensile stress and the angles (see FIGS. 4 and 5) involved become smaller as MD processing draw ratio increases, so compressive forces diminish with draw ratio. In addition, the distribution of filament diameters in the above precursor web is an order of magnitude larger than those of the present invention and thus the bending rigidity of CD fibers is very much higher while compression stresses are relatively small during processing. Elastomeric polymer webs (e.g., elastomers having rubber-like properties of an elastomer or rubber; that is, having the ability to stretch at least twice their original length and retract at room temperature) cannot be used in the present invention.

The precursor nonwoven web may be made from many of the thermoplastics capable of being melt blown, provided the polymer selected develops filaments of sufficiently high tensile processing modulus to permit the development of high lateral compression forces on the web. The thermoplastic resins useable in the production of nonwovens includes the nonelastomeric polyolefins such as polyethylene, polypropylene including high density polyethylene, ethylene copolymers (including EVA and EMA copolymers with high tensile moduli), nylon, polyamides, polyesters, polystyrene, poly-4-methylpentene-1, polymethylmethacrylate, polytrifluorochlorethylene, polyurethanes, polycarbonates, silicones, polyphenylene sulfide.

The crystallinity of the precursor web preferably should be sufficiently high to provide a room temperature breaking elongation less than 40%. Meltblown webs useable in the present invention should break at a strain of less than 40 percent in accordance with ASTM test method D 5035-90. The crystallinity in the range of 30 to 70 percent is preferred. In general, the proper high modulus and state of molecular orientation of the precursor is best reflected by a maximum or breaking draw ratio of the web during post treating of less than about 4.0.

In the post-treatment process, the thickness of the web should preferably be at least 2 mils and up to about 200 mils. The width of the web, of course, can vary within wide limits, with 5 to 150 inches being preferred. The average fiber diameter of the precursor meltblown web will preferably range from 0.5 to 8 microns, with 2 to 6 microns being preferred in order to provide the proper range of processing tensile stiffness for PP web. The porosity of the precursor web will normally be in the range of 50 to 95 percent. Calendered precursor webs approach 50%.

Other properties of the web, which while not critical, are important include a low occurrence of large shot or excessive ropiness.

Another important feature of the precursor web is that it includes at least some fiber-to-fiber bonding which is typical in meltblown webs. The bonding can be achieved by inherent fiber-to-fiber fusion, or by point bonding, calendering, or by fiber entanglement. The properties of the selected polymer can be controlled to a degree by operation of the meltblowing process. Some of these control variables are disclosed under the experiments below.

Process Conditions: As indicated above, the primary purpose of the process of the present invention is to consolidate the web in the cross direction to reduce the average pore size and the pore size distribution in the web. Consolidation of the web in the cross-direction is to be distinguished from consolidation resulting from calendering since consolidation to reduce thickness as in calendering flattens the fibers and closes flow channels, thus decreasing the permeability of the web to a greater extent compared to web draw consolidation.

Figure 4:
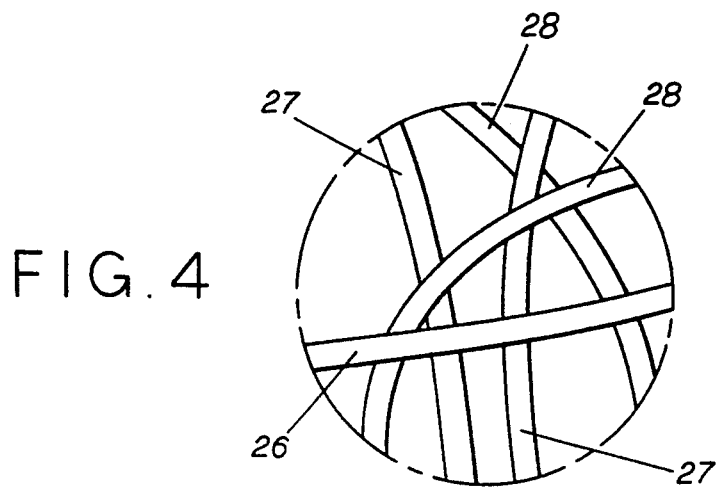
FIG. 4 is an enlarged plan view of a tiny planar segment of a meltblown web illustrating the random nature of a precursor web useable in the present invention.

The random nature of low stretch meltblown webs with the attendant thermal bonding and/or filament entanglement enable the development of MD stresses to reorient fibers and create sufficient compressive stresses to laterally consolidate or squeeze them together thus reducing the size of voids there between during uniaxial drawing. This results in narrowing of the web width without disrupting the planar integrity of the web and produces a product of unique properties. During the post-drawing process, the modulus that is in effect while the filament segments are being drawn depends on processing time-temperature effects. Maximum consolidation in the CD is achieved at a trial and error modulus at which the compressive stresses overcome to the largest extent the critical buckling stresses for the population of CD segments in the web. This is illustrated in the post-drawing process preferably carried out at a temperature where the polymer is in the rubbery state. This is best illustrated with reference to FIGS. 4, 5 and 6 which depict, respectively, the random disposition of nonwoven fiber, an idealized representation of unconsolidated nonwoven fibers, and an idealized representation of consolidated nonwoven fibers. The random disposition of the filaments forming a thin planar layer of the meltblown web is represented in FIG. 4 wherein longitudinal fibers 26 extend generally in the MD, transverse fibers 27 extended in the CD, and intermediate segments of fibers 28 extend at an angle with respect to the MD and CD.

Figure 5:
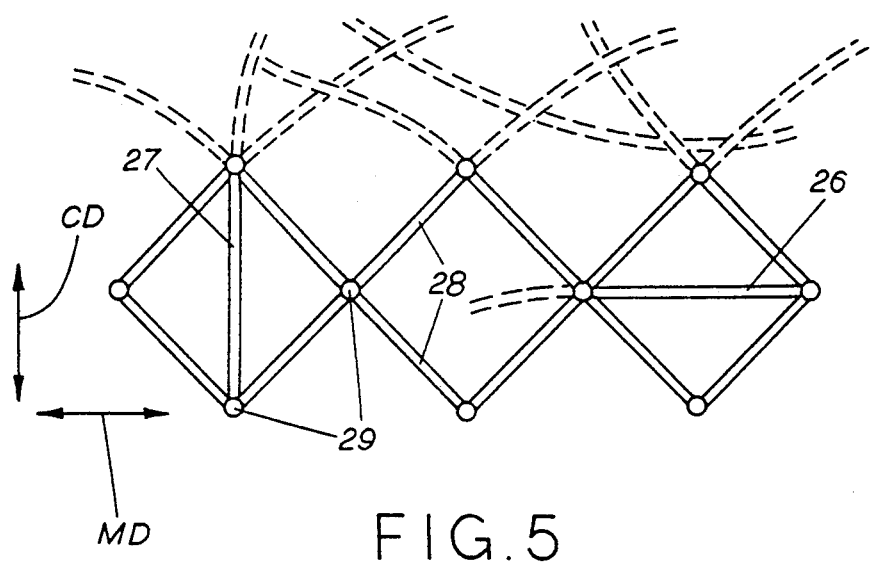
FIG. 5 is an idealized plan view representation of the fibers of a precursor web facilitating the analysis of the mechanisms involved in the present invention.

For purposes of analysis, this planar disposition may be represented by representative cells illustrated in FIG. 5. In the idealized representation or model in FIG. 5, the fibers 26, 27, and 28 are shown interconnected or bonded as a loose network at junctions 29 of the fibers. Again, it is to be emphasized that the bonds are fuse bonded during the meltblown process, or by fiber entanglement, or by thermal point calendering techniques. When the web structure shown in FIG. 5 is subjected to tension in the MD, the intermediate fibers 28 are easily aligned in the MD thus reducing pore dimensions whereas the CD fibers 27 tend to resist compression of the cell in which it is associated and may buckle and bend as illustrated in FIG. 6. The result is that the lateral consolidation of the precursor web in accordance with the present invention leaves pore space throughout the web layer which depends on the extent to which CD fibers are buckled. Fiber having a high slenderness ratio of length by diameter buckle easier. Ideally, the compressive force on element 27 in FIG. 6 is 2Tsin(theta) where T is the tensile force in elements 28 and $\Theta$ is the angle between element 28 and the MD. Without the bonding at junctions 29, the webs would easily rupture without generating lateral (CD) compression as in a carded web. Although actual webs do not include only the idealized structure as depicted in FIGS. 4 and 5, there is sufficient bonding and stresses developed in the select precursor web to provide the reduced porosity following the thermal drawing process as in FIGS. 6 and 7. Note that the buckled CD fibers 27 act as spacers limiting the residual porosity and pore dimensions developed by the resultant compression forces due to the MD tensile drawing force. To supplement the compression of large diameter fibers and shot, external mechanical means can be incorporated to further compress the hot drawn web near 17c in order to augment the CD fiber bending and buckling beyond that obtained by hot drawing alone. One such apparatus embodiment is illustrated in FIG. 3 described above in which the mostly drawn web is subjected to transverse compression forces because the web is tracking the converging surface of the torus.

The post-drawn web withdrawn from the oven and preferably heat set exhibits two surprising and highly useful properties: (1) the pore space and all measures of pore size distribution have been reduced, and (2) the web exhibits remarkable elasticity in the CD. These two properties will be discussed in detail later.

The post-drawing process conditions and precursor properties for achieving the web with the improved properties described above are as follows:

|  | BROAD RANGE | PREFERRED RANGE | BEST MODE |
|---|---|---|---|
| Draw ratio, V2/V1 | 1.05–3.00 | 1.10–2.00 | 1.2–1.80 |
| Temperature, °F. (PP) | 165–425 | 250–350 | 275–300 |
| V1, Feed Speed, F/M | 10–400 | 25–200 | 35–60 |
| MAX pore size, µM | 5–250 | 10–150 | 20–50 |
| Crystallinity, % | 30–95 | 30–80 | 35–60 |
| Thickness, mils | 2–200 | 2–100 | 6–20 |
| Avg. Fiber Dia. µM | 0.5–50 | 0.5–8 | 1.7–6 |
| Strain rate, per min | 10–500 | 20–200 | 30–60 |
| Hot processing | 1.3–4 | 1.7–3.5 | 2–3 |

|  | BROAD RANGE | PREFERRED RANGE | BEST MODE |
|---|---|---|---|
| breaking draw ratio, V2/V1 |  |  |  |
| Reduction in pore size (MAX, MFP, and range), % | 20–85 | 25–75 | 35–70 |
| Elastic recovery from 50% strain, % | 50–99 | 70–99 | 80–95 |
| Liquid absorption aspect ratio | 1.2–6 | 1.76–5 | 2–4 |

It should be observed that the geometric minimum MD strain for complete lateral consolidation of an idealized web in FIG. 5 is 42 percent or DR=1.42. However, in the most preferred embodiment the invention contemplates draw ratios in excess of about 1.42 since higher draw ratios will enhance the reduction in porosity, which is limited by the spacer effects of partially buckled CD fibers.

OPERATION

The selection of the resin and meltblowing operating conditions, precursor webs having the necessary properties may be obtained based upon the above description.

Although the precursor webs made up of any of the thermoplastic polymers used in meltblowing (provided they possess the necessary properties) may be used, the following polypropylene precursor meltblown web has produced excellent results in experiments carried out at the University of Tennessee.

| PP Grade (Exxon Grade) | PD-3495 G |
|---|---|
| MFR | 800 |
| Thickness | 13 mil |
| Width | 14 inches |
| Basis Weight | 1.5 oz/yd$^2$ |
| Porosity | 87% |
| Crystallinity | 50% |
| Web elongation at break | 10% |

As illustrated in FIG. 2, the precursor web 17 in a generally flat disposition is processed according to the present invention by passing the flat web 17 in an oven 23 at a temperature between the softening and melting temperature of the polymer (e.g., for PP, about 310 degrees F.). The line speed and draw ratio are selected to impart the desired lateral consolidation of the web expressed as a ratio of the web width entering to web 17 width exiting the oven (c/a in FIG. 2). The c/a values should be from 1.3 to 4, preferably from 1.5 to 3, and most preferably 2 to 2.5. Web thickness entering the oven may range from 2 mils to 100 mils and those exiting may range from between 2 and 150 mils, indicating that the thickness may under certain conditions increase. Draw ratios of 1.05 to 3.00, preferably from 1.10 to 2.00, and most preferably 1.2 to 1.8 may be used to achieve satisfactory consolidation. Line speeds (V2) can range from 10 to 400 fpm. As mentioned above, webs capable of hot processing breaking draw ratios greater than about 4 are unsuitable.

It is preferred that the consolidated and annealed web leaving the oven be cooled, either by ambient temperature or supplemental air to impart a set to the fibers in the deformed condition. The consolidated heat set web can be rolled up for later conversion to end use products.

Figure 7:
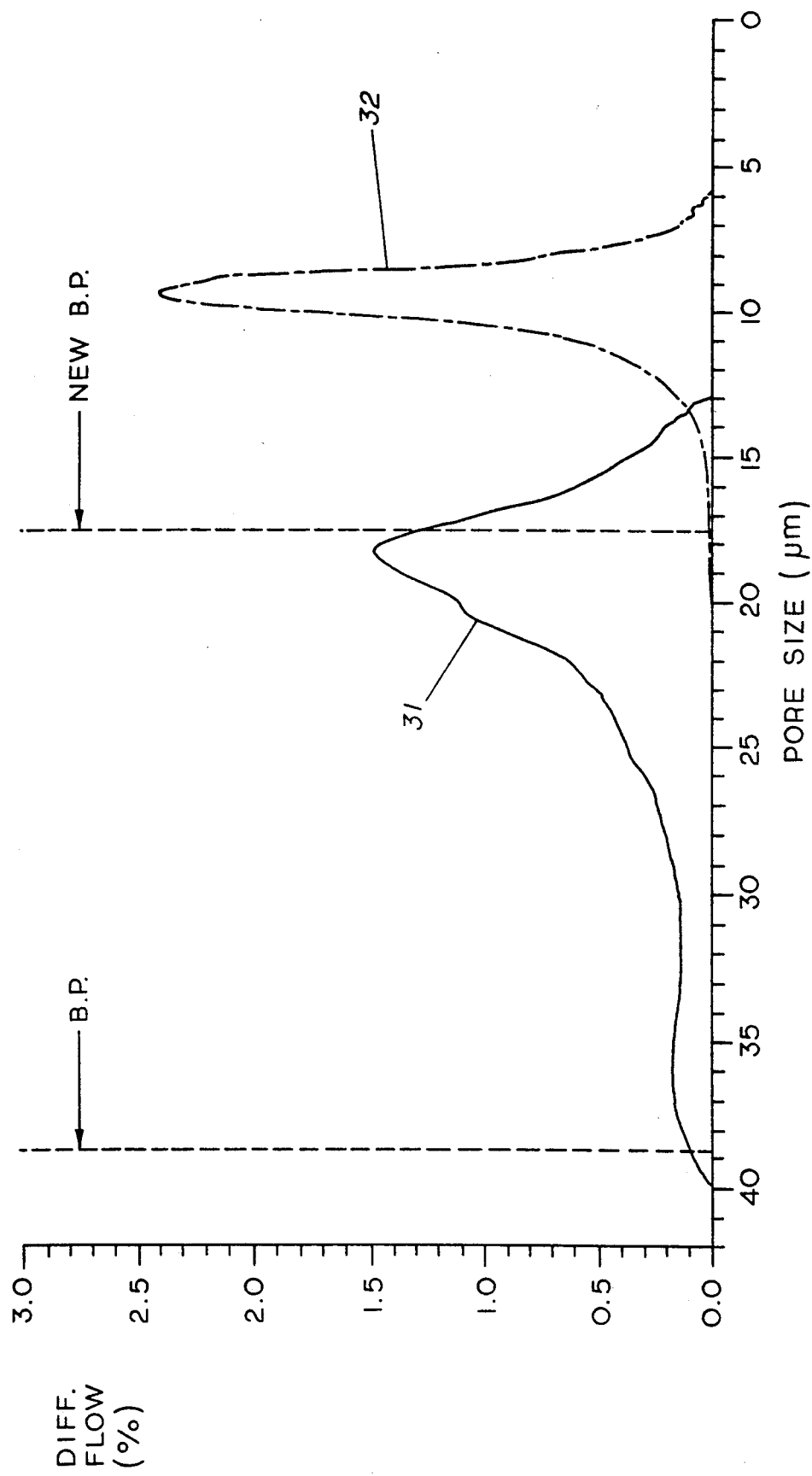
FIG. 7 presents two curves illustrating the pore size distribution of a web before and after drawing.

The web consolidation restructures the fibers of the web by aligning more of the fibers in the MD. The fiber bonding transforms tensile stress into CD consolidation in the manner described above, thereby reducing all of the web's measures of pore size distribution. These measures of pore size distribution of the web are the maximum pore size (MAX), the mean flow pore size (MFP), and the minimum pore size (MIN) as measured by a Coulter Porometer, described below in connection with Experiments. The Coulter Porometer produces a characteristic distribution—size plot for each web where pore size plotted against percent differential flow through the web. FIG. 7 compares the characteristic curve for a precursor web (Plot 31), and the characteristic plot for the consolidated web (Plot 32). A comparison of Plot 31 (precursor web) and Plot 32 (consolidated web) illustrates the dramatic effect of consolidation. As can be seen in FIG. 7, the pore size distribution ranged from about 13 to about 40 microns (a range or spread of 27 microns), and the mean flow pore size was about 20 microns.

In the consolidated web (Plot 32), pore size distribution ranged from 6 to 17.5 microns (a spread of only 11.5 microns), with the mean flow pore size of 9.4 microns. The web consolidation according to the present invention thus reduced the spread of the pore size distribution from 25 to 11.5 microns and the average pore size from about 20 (Plot 31) to about 9 (Plot 32). The maximum pore size (BP) was reduced from 38.7 to 17.5 microns. The consolidated web exhibited excellent "stretch fabric" elasticity in the CD and tested extremely well as a filter.

EXPERIMENTS

Definitions: In order to better understand the terms used herein, particularly in the Experiments described below, the following definitions consistent with the accepted technical definitions in the industry, are submitted.

Web Pore Space (porosity)—the ratio of the volume of air or void contained within the boundary of a material to the total volume expressed as a percentage. Packing density equals 1 minus porosity.

Coulter Porometer—a semiautomated instrument using a liquid displacement technique to measure the pore size measures and distributions of a sample according to ASTM F 316-86.

Web Pore Size Distribution—the distribution of pore sizes between the maximum and the minimum pore size as determined by ASTM F 316-86 on the Coulter II Porometer. (The maximum pore size [or bubble point] measure is distinguished in that it strongly relates to permeability, pressure drop, and filtration efficiency performance properties for the entire family of meltblown webs we studied.)

ASTM 316-86 Measures of Pore Size Distribution—MAX is the standardized measure of the diameter of the largest pore channels in the distribution of pore sizes supporting flow through the web. MFP is the measure of the median (or mean) pore channel diameter for the pores supporting the total flow. MIN is the minimum pore size measured for the web.

Polymer Crystallinity—the relative fraction of highly ordered molecular structure regions compared to the poorly ordered amorphous regions. Crystallinity is determined by X-ray or DSC analysis.

Polymer Birefringence—is a property which is usually observed in optical microscopes when a material is anisotropic, that is when its refractive index is directional. Fibers having molecular chains of higher axial directionality have higher birefringence and relatively low tensile elongation at break.

Softening Temperature—is a thermal property of a polymer characterized by a temperature at which the material becomes sticky, viscous, or elastic (soft) prior to melting and looses its room temperature modulus (and can undergo plastic elongation) leading to maximum molecular orientation and breakage.

Average Fiber Diameter—a measure of the mean fiber diameter of the fibers in the web obtained from individual measures of the fibers diameters in focus on a scanning electron micrograph of the subject fibrous web—about 100 fibers are measured. Finer fibers generally arise from greater draw-down in meltblowing and have higher birefringence.

Web Elongation at Break—for a crystalline polymer is strain rate and temperature dependent. The elongation of fiber-diameter and was controlled by varying the primary air levels in the line from 70 to 95%, (b) the level of bonding in the web was controlled by adjusting the air to polymer ratio, the die to collector distance, the air temperature, the melt temperature and collector vacuum. Tenacity and the elongation-at-break was used to qualify the bonding strength for the samples.

The slenderness ratio of fiber segments subjected to compression as well as the magnitude the bending forces developed by drawing are ultimately related to the above.

The post-drawing on the precursor web was done in experimental apparatus similar to that illustrated in FIGS. 2 and 3. The rollers were provided with speed controls.

The polymer used in all of the tests was polypropylene (PP). The PP precursor web samples used in the tests are described in TABLE I.

TABLE I

| Sample | % Air | Packing Density | Ave. Fiber Diam. μm | Break Elong. | Pore Sz. Measures, μm | | | Break D.R. |
|---|---|---|---|---|---|---|---|---|
| | | | | | Max | MFP | Min | |
| A | 90 | 0.095 | 3.2 | 7.4 | 19.3 | 15.4 | 11.1 | 2.2 |
| B | 90 | 0.110 | 3.9 | 6.3 | 17.9 | 14.3 | 10.5 | 2.5 |
| C | 85 | 0.085 | 4.0 | 17.4 | 28.3 | 16.6 | 10.7 | 2.5 |
| D | 80 | 0.129 | 5.5 | 6.6 | 38.8 | 20.1 | 13.8 | 3.0 |
| E | 70 | 0.145 | 8.5 | 3.0 | 20.8 | 14.4 | 10.9 | 3.5 |
| F | 70 | 0.163 | 9.9 | 4.1 | 40.5 | 24.2 | 16.5 | 3.7 |
| G | 70 | 0.172 | 8.8 | 5.7 | 33.0 | 20.6 | 13.7 | 3.8 |
| H | 60 | 0.168 | 18.5 | 2.7 | 117.0 | 68.0 | 25.0 | 6.0 | tion at break primarily measures the extent of a plastic deformation process beginning at the initial state and terminating at the final well ordered state of molecular orientation (MO) of the polymer. Precursor webs having fibers of high crystallinity and order have low elongation to break (from R. J. Samuels, Structured Polymer Properties, John Whiley & Sons, 1973). For the meltblown webs, evaluating the precursor MO state by breaking elongation is best accomplished at high temperatures instead of at standardized ASTM D 5035-90 room temperature test because of the wide range in fiber diameters, MO state and bonding in meltblown webs. The meltblown precursor webs were characterized by the magnitude of the breaking draw ratio attained while hot drawing at a strain rate at least 25 min−1 (or 2500%/min) and temperature at least 10° F. below the melting temperature of the precursor thermoplastic polymer (Hot breaking draw ratio).

Web Tensile Modulus—is the measure of the force required to produce a small extension (or compression). A highly inextensible material will usually have a large modulus.

Web Elasticity—that property of a body by virtue of which it tends to recover its original size and shape after deformation. Elastic recovery from elongation is given by (stretched length−recovered length)/(stretched length−original length). The recovery from an initial elongation is stated, such as, from a 100% CD strain.

Materials and Equipment: All the samples used in the experiments were prepared using a meltblowing line at The University of Tennessee. The process conditions to produce a desired sample for evaluation were controlled as follows:

(a) the level of hot-drawability, as related to birefringence and tensile modulus during processing is a func- Filtration Measurement: The filtration efficiency was based on dry particulate capture efficiency test using nominal 1.0 micrometer mono dispersed latex particles at an aerosol flow rate of 10 centimeters per second (ASTM 1215).

The filtration experiments were carried out as described above. Each webs "filtration" performance is expressed as particle capture efficiency (filtration efficiency) based on the following formula:

$$F.E. = \frac{\text{Number of particle counted without filter} - \text{Number with filter}) \times 100, \%}{\text{Number without filter}}$$

Web Measurements: Fiber diameters were measured by SEM photographs of the specimens.

Maximum, mean flow pore size, minimum, and pore size distribution spread in terms of the maximum and minimum, was based on a Coulter Porometer according to ASTM F 316-86.

Pore Space: Measurements were based on weights of dry specimens and the weight of the specimen wetted out with a liquid of known density. Planar densification is evidenced by the increase in packing density (PD) measure of the web given by the ratio of dry web weight to the weight of the void-free web. Porosity of the web or pore space is given by one minus the packing density.

The tests for measuring elasticity of the consolidated web were as follows: Measured the percentage to which specimen recovered its original (CD) length immediately following a given % (CD) elongation, for example, sample A recovered 92% of its original length following a 100% CD elongation. Another test on the consolidated webs included directional absorption of liquids. Surfactants for improving the water wettability of the fibers were applied to PP webs prior to aqueous absorption tests. The surfactants were nonionic and other types such as nonionic polyoxyethylenated tert-octylphenol, anionic ammonium lauryl sulfate, and cationic sulfobetaines. Directional absorption was characterized by the aspects ratio of the absorption pattern produced when a ML of liquid was applied to a point on the specimen supported on a horizontal surface. For a variety of meltblown and spunbonded specimens, absorption aspect ratios ranged from 1.7 to about 5. The test results carried out on the webs consolidated at a DR of 2 are presented in TABLE II. Table III gives the filtration efficiency values for meltblown webs variously consolidated at draw ratios of 1.0 (undrawn precursor web), 1.5 (precursor drawn 50%), 2.0 (these data also plotted in FIG. 9), and 2.5.

TABLE II

| Sample | Oven Temp. °C. | Elastic recovery from strain of | | Properties of DR = 2.0, % of precursor web | | | |
|---|---|---|---|---|---|---|---|
| | | 50% | 100% | Packing Density | Pore Size Measures, μm | | |
| | | | | | Max. | MFP | Min. |
| A | 150 | 95 | 92 | 214 | 50 | 46 | 42 |
| B | 155 | 93 | Break | 250 | 44 | 39 | 39 |
| C | 150 | 95 | 90 | 302 | 49 | 60 | 65 |
| D | 150 | 95 | 90 | 163 | 38 | 48 | 51 |
| E | 150 | 87 | Break | 124 | 155 | 124 | 118 |
| F | 150 | Break | Break | 101 | 73 | 76 | 78 |
| G | 150 | 85 | Break | 95 | 113 | 103 | 108 |
| H | 150 | Break | Break | 99 | 128 | 115 | — |

The Table II data and properties of webs consolidated at DR=2 reveal that the pore sizes of Samples A through D were reduced by 38 to 65% and the packing density for the same samples were increased from 163 to 302%.

TABLE III

| | Filtration Efficiency, % | | | |
|---|---|---|---|---|
| Sample | DR = 1 | DR = 1.5 | DR = 2.0 | DR = 2.5 |
| A | 43 | 74 | 77 | Break |
| B | 45 | 86 | 89 | 80 |
| C | 32 | 64 | 66 | 81 |
| D | 21 | 35 | 54 | 60 |
| E | 14 | 13 | 22 | 18 |
| F | 16 | 20 | 19 | 29 |
| G | 14 | 13 | 18 | 18 |
| H | 6 | 4 | 4 | 3 |

In Table I, the maximum hot draw ratio is the magnitude of the breaking draw ratio during hot processing and solely defines the molecular orientation present in the filaments of the precursor melt blown webs. Web of PP having a maximum DR greater than about 3.5 are not consolidated according to the present invention. Compare pore measures in Table I and the changes produced at a DR of 2.0 in Table II. The data on FIG. 9 indicates that filtration efficiencies improve significantly for fiber diameters less than 8 microns, particularly less than 6 microns, the preferred and most preferred fiber sizes. Note that these small fiber sizes further distinguish over U.S. Pat. No. 4,048,364.

Figure 8:
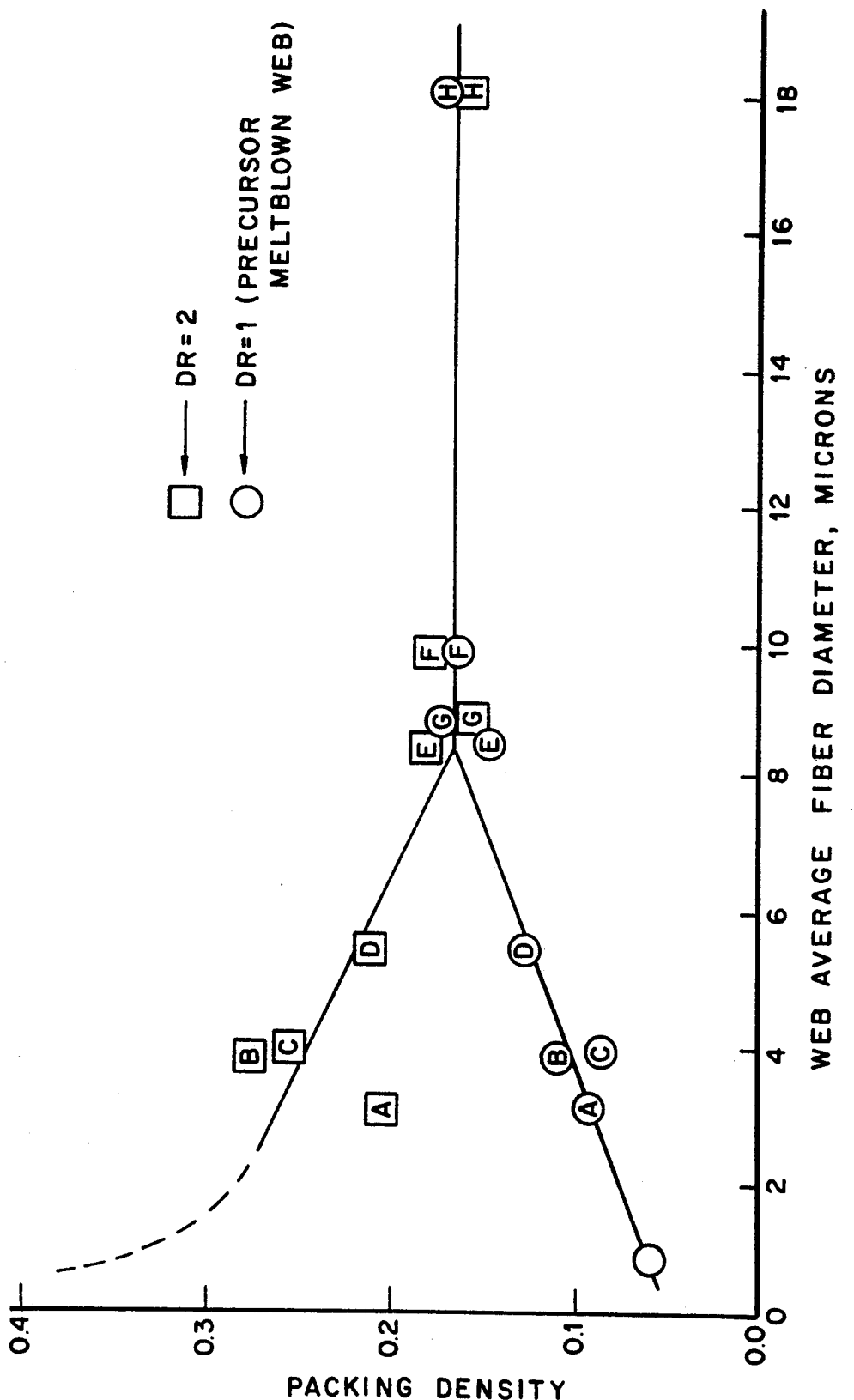
FIG. 8 is a plot illustrating that precursor meltblown webs (circles) having average fiber diameter less than eight microns (sample data from Tables I and II) are increasingly densified by the post-drawing (squares).
Figure 9:
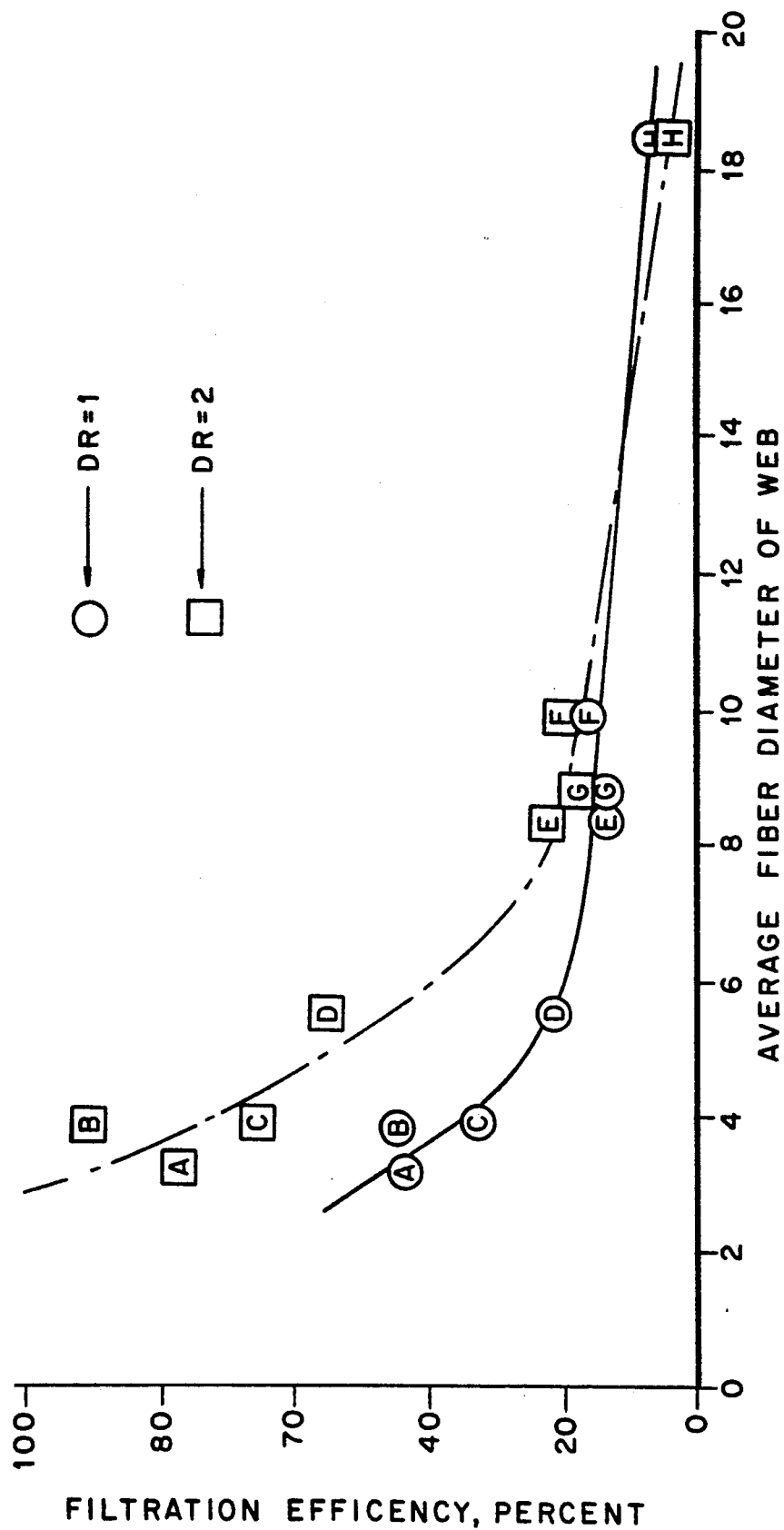
FIG. 9 is a plot illustrating that precursor meltblown webs (circles) having fiber diameter greater than about eight microns show negligible improvement in particle filtration efficiency after post drawing (squares).

FIG. 8 is a plot of packing density (PD) versus average fiber diameter for the precursor and processed webs. FIG. 8 indicates that web densification or consolidation initiates in meltblown precursor webs having average fiber diameters less than about 8 μm for meltblown polypropylene webs. MB webs from precursors having fiber diameters greater than about 8 microns experience little to no alteration in packing density (or other performance properties) according to the method of the present invention. Other measures of web performance such as filtration efficiency, air permeability, and maximum pore size (see Table I, II and Table III) show similar response to web average fiber diameter as shown in FIG. 9 for filtration efficiency. In the experiments, these properties were generally maximized by post treating at draw ratio between about 1.5 and 2.0 for the precursors.

ALTERNATIVE EMBODIMENTS

Spunbond Webs: As indicated above, the principles embodied in the present invention have application with nonwoven webs others than meltblown webs. For example, for spunbond webs which are characterized as having average filament diameters of 7 to 50 microns and elongation to break less than about 200% according to ASTM Test D 5035-90. The spunbond webs are prepared by melt spinning a multiplicity of filaments molecularly oriented by plastic deformation drawdown and depositing the same on a moving collector to form a random collection of uniform filaments arranged similar to that depicted in FIG. 4. The deposited filaments are then bonded by mechanical entangling, needling, hot calendering or otherwise thermal bonding at a plurality of points to impart integrity and strength to the spunbond material. It should be noted that bonding such as thermal or mechanical bonding is normally necessary since the filaments are not typically fused or sufficiently entangled upon being laid or deposited on the collector. For spunbonded precursors, the bonding must be strong (such as high temperature point bonding) in order to locally elongate, buckle, and bend the filament segments without spoiling the web integrity (see FIGS. 5 and 6) because the drawn filaments have relatively high tenacity and modulus. In point bonding, the bond points and bonding pattern generally are as follows: The area of heated bonding points are 5 to 25% of the roll area and the shape of the raised points can be diamond shaped or a number of other shapes and point distribution.

The consolidation of the spunbond (SB) web in accordance with the present invention occurs as follows: Hot drawing the SB web creates reduction in the measures of pore size and creates CD elasticity because the tensile forces generate sufficient compressive forces to plastically buckle and bend C segments of the filaments for inventive reduction of pore measures. The elasticity in the CD direction is a result of elastic recovery from bending of the well bonded network of strong filaments arranged similar to that idealized in FIG. 6.

An example of the spunbond process was as follows: Spunbonded web was 1 meter wide, 1 oz/sq. yd. produced from 35 MFR PP on a Reicofil machine bonded between 90° and 140° C. at the University of Tennessee. Oven temperature 315° F., draw ratio 1.20 output velocity (V2) 50 FPM.

Electrostatic Charged Webs: Another variation contemplated by the present invention is to apply an electrostatic charge to the consolidated web to improve its filtration performance. The charging in the production of electrets can be applied by a variety of techniques described in the patent literature. See for example U.S. Pat. No. 4,592,815, the disclosure of which is incorporated herein by reference. It is anticipated that the higher packing density of fiber in the hot consolidated webs results in an unusually high effectiveness of electron implantation in the web. As an example of the effect of charging consolidated samples on web Filtration Efficiency (FE), a 1.0 oz/sq.yd. precursor meltblown sample had an FE of 30%, the FE after only consolidating this web at a DR of 1.5 was 79%, and finally the FE after charging this consolidated web was 99.8%.

Since meltblown webs and spunbonded webs are relatively isotropic, the invention process can also be carried out by hot drawing in the CD as a continuous process (such as on a tenter frame at negative or minimal MD tension) or on a "by piece" process.

Laminate and Composite Webs: As mentioned above, the precursor web may comprise a composite of the following combinations: meltblown web/meltblown web (different webs), meltblown web/other nonwoven web (e.g., spunbond, hydroentangled, etc.) also, webs of thermoplastic/nonthermoplastics combinations make useful precursors. These composite precursors can be made by techniques well known in the art. The composite may also include more than two layers. The meltblown web of the composite will have the properties described above.

One particularly useful composite precursor is the spunbond/meltblown/spunbond (SMS) structure.

The meltblown web should have the properties described above for meltblown webs. The spunbond webs may be the same or different but should have the properties described above for spunbond webs. The SMS composite precursor may be made by conventional methods, well known in the art.

The spunbond webs add strength and abrasion resistance to the structure thus increasing the application of the webs consolidated by the process of the present invention, particularly in the areas of surgical gowns, drapes, health care packaging, etc. The consolidated composite is characterized by:

a) good elasticity in the CD;
(b) good strength; and
(c) improved filtration efficiency.

It has also been observed that hot or cold CD stretching following consolidation by MD stretching (as described above) produces an open reticulated fabric having exceptional web uniformity and high porosity for an open structure. Hot stretching in the CD at large draw ratios (e.g., about 1.4) produces a netting structure that has applications such a high porosity HVAC filters and containers.

The following experiments demonstrate the effect of drawing an SMS precursor web in accordance with the process of the present invention. The SMS web was thermally point bonded and had the following composition:

|   | Web Composition | Thickness, Mils | Basis Wt, oz/yd$^2$ |
|---|---|---|---|
| S | Spunbond PP | 3 | 0.3 |
| M | Meltblown PP | 9 | 1.7 |
| S | Spunbond PP | 3 | 0.3 |

The precursor web was processed at a draw ratio of 1.9 through a 315 degree Fahrenheit oven at 21 fpm. The drawn web was permitted to cool to room temperature while under the applied MD tension.

Cyclic load-extension tests in the CD were carried out. TABLE IV presents the results.

TABLE IV

| Sample | Stretch | Peak Load (Grams) | | CD Extension Recovery, % | |
|---|---|---|---|---|---|
| | | 1st Cycle | 5th Cycle | 1st Cycle | 5th Cycle |
| SMS | 50% | 95 | 90 | 82 | 73 |
| | 100% | 410 | 380 | 60 | 46 |
| | 200% | 1540 | 1440 | 37 | 32 |

The elasticity of the drawn SMS fabric makes the fabric particularly useful in surgical gowns requiring relatively high strength, stretchability and barrier properties.

The same consolidated SMS fabric was tested for filtration efficiency. The filtration tests were carried out on the SMS fabric without consolidation and the SMS fabric after consolidation. The drawn or consolidated SMS web exhibited a filtration efficiency of 80.8% whereas the precursor SMS web exhibited a filtration efficiency of only 67.7%.

SUMMARY

As demonstrated by the experimental data herein, the method of the present invention produces a nonwoven fabric that posses unique and useful properties that lends the fabric to application in a variety of fields. The properties of reduced pore size and pore size distribution makes the web ideally suited for filtration and absorption. The property of CD elasticity increases the web utility in filtration (e.g., surgical masks where conformance to the face contours is important) and other uses such as flexible gowns or diapers and hygiene products.

What is claimed is:

1. A nonwoven web made from a precursor nonwoven web comprising randomly deposited nonelastomeric thermoplastic fibers and being uniaxially drawn and heat set, wherein the uniaxial heating and drawing are carried out continuously by passing the precursor web into an oven at a first linear velocity and withdrawing the precursor web from the oven at a second linear velocity and wherein the ratio of the second velocity to the first velocity ranges from about 1.1:1 to 2:1, whereby a majority of the fibers are consolidated and aligned generally in the direction of draw and a minority of segments of fibers are disposed crosswise or transversely to the direction of draw, whereby the web is characterized by a maximum pore size of less than 80% that of the precursor web and has an elasticity in the cross direction of at least 70% recovery from a 50% elongation in the cross direction.

2. The nonwoven web of claim 1 wherein the web is composed of nonelastomeric thermoplastic meltblown fibers randomly bonded and having an average diameter of 0.5 to 8 microns.

3. The nonwoven web of claim 2 wherein the web has a mean flow pore size of between 3 to 40 microns.

4. The nonwoven web of claim 1 wherein the fibers are at least partially coated with a surfactant for increasing the water wettability of the fabric.

5. A laminate comprising:
(a) the web of claim 1; and
(b) a polymeric substrate bonded to said web.

6. The nonwoven web of claim 5 wherein the substrate is an elastomeric web.

7. The nonwoven web of claim 5 wherein the substrate is a film.

8. The nonwoven web of claim 5 wherein the substrate is a textile that limits the cross direction extensibility of the laminate to less than 100% strain.

9. A nonwoven web made from a precursor nonwoven web, said precursor comprising a lamination of individual nonwoven webs having nonelastomeric fibers and being uniaxially drawn and heat set, wherein the uniaxial heating and drawing are carried out continuously by passing the precursor web into an oven at a first linear velocity and withdrawing the precursor web from the oven at a second linear velocity and wherein the ratio of the second velocity to the first velocity ranges from about 1.1:1 to 2:1, whereby a majority of the fibers are consolidated and aligned generally in the direction of draw and a minority of segments of fibers are disposed crosswise or transversely to the direction of draw, whereby the web is characterized by a maximum pore size of less than 80% that of the precursor web and has an elasticity in the cross direction defined by at least 70% recovery from a 50% elongation in the cross direction.

10. A longitudinally extending nonwoven web made from a precursor nonwoven web having nonelastomeric, thermoplastic fibers characterized in that the majority of the fibers have been consolidated in a direction transverse the length of the web and are disposed generally in the longitudinal direction of the web, wherein the consolidation is carried out by passing the precursor web into an oven at a first linear velocity and withdrawing the precursor web from the oven at a second linear velocity and wherein the ratio of the second velocity to the first velocity ranges from about 1.1:1 to 2:1, whereby the maximum pore size of the web represents less than 70% of the maximum pore size of the precursor web and, a minority of the fibers in the web extent transverse the longitudinal direction of the web and a portion of which are bonded to the longitudinal fibers, disposed said web further being characterized as having a level of elasticity defined by at least 70% recovery from a 50% elongation in a direction crosswise of the longitudinal direction of the web.

11. A filter comprising meltblown web having nonelastomeric thermoplastic fibers having an average diameter of 0.5 to 8 microns, the majority of which are generally aligned in one direction, wherein the fibers are aligned by passing a precursor web into an oven at a first linear velocity and withdrawing the precursor web from the oven at a second linear velocity and wherein the ratio of the second velocity to the first velocity ranges from about 1.1:1 to 2:1, said web having a mean flow pore size of 2 to 50 microns, a pore size distribution spread of 4 to 100 microns, and an elastic recovery of at least 40% from a 100% elongation in a direction normal to the direction of the aligned fibers.

12. The filter of claim 11 wherein the filter having a basis weight of less than 1.5 oz/sq. yd. is capable of capturing at least 50% of particles larger than or equal to 1 micron measured at an aerosol velocity of 10 centimeters/sec.

13. A face mask comprising the filter of claim 11.

14. The filter as defined in claim 11 wherein the fibers contain an electrostatic charge.

15. The filter as defined in claim 11 wherein the web has an electrostatic charge applied thereto.

16. A method for post treating a nonwoven web which comprises:
(a) selecting a precursor nonwoven web made of randomly collected nonelastomeric thermoplastic fibers having a crystallinity of at least 30%, said web having a maximum processing draw ratio at break of less than 4 at a temperature at least 10° F. less than the melting point of the precursor thermoplastic and at a strain rate of at least 2500%/min, and a maximum pore size measure of from 4 to 250 microns based on ASTM F316-86;
(b) heating the precursor web at a temperature between the softening temperature and melting temperature of the thermoplastic;
(c) drawing the heated web under tension in a substantially longitudinal direction to cause the web to consolidate laterally and thereby reduce the maximum pore size measure of the web by at least 20%, wherein the heating and drawing steps are carried out continuously by passing the precursor web into an oven at a first linear velocity and withdrawing the precursor web from the oven at a second linear velocity, the ratio of the second velocity to first velocity ranges from about 1.1:1 to 2:1; and
(d) cooling the web or permitting the web to cool.

17. The process as claim 16 wherein the drawing step is sufficient to provide the web with a mean flow pore size measure at least 20% smaller than the mean flow pore size of the precursor web.

18. The process of claim 16 wherein the drawing step is sufficient to provide the web a packing density at least 20% greater than that of the precursor web.

19. The method of claim 16 wherein the cooling step is carried out prior to release of the drawing tension and cools the web to a temperature below the softening temperature of the thermoplastic.

20. The method of claim 16 wherein the nonwoven precursor web is a meltblown web having an average fiber diameter of 0.5 to 8 microns and having an elongation at break of less than 30% based on ASTM D 5035-90.

21. The method of claim 20 wherein the precursor nonwoven web has a breaking elongation less than 40% based on ASTM D 5035-90.

22. The method of claim 16 wherein the thermoplastic is a polyolefin selected from the group consisting of polypropylene, polyethylene, and copolymers thereof, and the heating step is carried out at a temperature of between 190 to 350 degrees Fahrenheit.

23. The method of claim 22 wherein the meltblown precursor web has randomly distributed throughout fiber-fiber bonding.

24. The method of claim 16 wherein the thermoplastic is selected from polyesters, polyamides, cellulose triacetate, cellulose diacetate, poly-4-methylpenetene-1, polyphenylene sulfide, liquid crystal polymers and fluoropolymers.

25. The method of claim 16 wherein the precursor nonwoven web is a spun-bond web having fibers of from 7 to 50 micron average diameter and having spaced apart bonds distributed through the web.

26. The method of claim 16 and further comprising the step of passing the drawn web over a bar or roller having a surface to impart transverse compression forces inwardly of the width of the web.

27. The method of claim 16 wherein the first velocity is controlled by passing the precursor web through the nip of first counter rotating rollers prior to the heating step, and the second velocity is controlled by passing the consolidated web through the nip of second counter rotating rollers after the heating step, and wherein the consolidated web is permitted to cool to a temperature below the softening point of the thermoplastic prior to passing through the nip of the second counter rotating roller.

28. The method of claim 16 wherein the precursor nonwoven web is made of a laminate of at least two distinct nonwoven webs, each web made of randomly collected nonelastomeric thermoplastic fibers and each web has distributed throughout fiber-fiber bonding.

29. The method of claim 28 wherein the precursor web is a composite comprising a spunbond layer/a meltblown layer/and a spunbond layer, wherein the layers are thermally bonded together at spaced apart locations.

30. The method of claim 16 wherein the precursor web has a width of 6 to 160 inches and a thickness of 2 to 100 mils and wherein the drawn web has a width of less than 80% of the precursor web and a thickness of 2 to 150 mils and wherein the thickness ratio of the drawn web and precursor web ranges from 1:1 to 1.5:1.

* * * * *